(12) United States Patent
Ashida et al.

(10) Patent No.: US 7,457,479 B1
(45) Date of Patent: Nov. 25, 2008

(54) IMAGE PLAYBACK APPARATUS

(75) Inventors: Tetsuro Ashida, Asaka (JP); Kimiaki Nakada, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 711 days.

(21) Appl. No.: 09/707,948

(22) Filed: Nov. 8, 2000

(30) Foreign Application Priority Data

Nov. 9, 1999 (JP) ................................. 11-317884

(51) Int. Cl.
*G06K 9/20* (2006.01)
*G06K 9/36* (2006.01)
*G06K 9/00* (2006.01)

(52) U.S. Cl. ..................... 382/282; 382/167; 382/173

(58) Field of Classification Search ............... 382/282, 382/276, 173, 237, 167; 358/520–522, 1.9, 358/1.15, 1.14, 501, 471; 345/163, 150, 345/154, 156; 600/26; 348/14.07, 362
See application file for complete search history.

(56) References Cited

U.S. PATENT DOCUMENTS

| | | | | |
|---|---|---|---|---|
| 5,235,437 A * | 8/1993 | Katagiri et al. | .............. | 358/471 |
| 5,426,517 A * | 6/1995 | Schwartz | .................... | 358/520 |
| 5,521,723 A * | 5/1996 | Madden et al. | .............. | 358/501 |
| 5,588,050 A * | 12/1996 | Kagawa et al. | .............. | 382/167 |
| 5,606,345 A * | 2/1997 | Truchet | ....................... | 345/788 |
| 5,953,459 A * | 9/1999 | Ueda et al. | .................. | 382/237 |
| 6,005,971 A * | 12/1999 | Bergman et al. | ............ | 382/165 |
| 6,078,349 A * | 6/2000 | Molloy | .................... | 348/14.07 |
| 6,102,846 A * | 8/2000 | Patton et al. | ................... | 600/26 |
| 6,195,474 B1 * | 2/2001 | Snyder et al. | ............... | 382/312 |
| 6,204,881 B1 * | 3/2001 | Ikeda et al. | .................. | 348/362 |
| 6,493,111 B2 * | 12/2002 | Inukai et al. | ................. | 358/1.9 |
| 6,608,615 B1 * | 8/2003 | Martins | ....................... | 345/156 |

FOREIGN PATENT DOCUMENTS

| | | |
|---|---|---|
| JP | 683430 | 8/1992 |
| JP | 6-231080 A | 8/1994 |
| JP | 8-279958 A | 10/1996 |
| JP | 1169179 | 8/1997 |
| JP | 11-185031 A | 7/1999 |
| JP | 11-266358 A | 9/1999 |

* cited by examiner

Primary Examiner—Aaron W Carter
(74) Attorney, Agent, or Firm—Birch, Stewart, Kolasch & Birch, LLP (57) ABSTRACT

To provide an image playback apparatus that enables an image picked up and recorded with a wide dynamic range to be changed to the exposure desired by a viewer. An apparatus that performs image playback by outputting, to a monitor or printer, image data stored in an image storage unit such as built-in memory or a memory card, is equipped with a line-of-sight detection apparatus that detects the line-of-sight direction of the person viewing the image, or a touch panel, and is configured so that the area looked at by the viewer is automatically detected, or an arbitrary part of the screen can be specified by the viewer himself or herself from the touch panel. At first, conventional dynamic range playback is performed, then the dynamic range is changed, by changing the tone conversion curve, etc., for the part where the line-of-sight was detected within the screen, or the part specified by means of the touch panel, and a white-skip part or blackening part is reproduced appropriately.

20 Claims, 9 Drawing Sheets

FIG. 10 a# IMAGE PLAYBACK APPARATUS

BACKGROUND OF THE INVENTION

1. Field of the Invention

The present invention relates to an image playback apparatus, and relates in particular to an image playback apparatus that outputs an image recorded with a wide dynamic range to a display device, printer, or the like, to reproduce that image.

2. Description of Related Art

Images picked up with appropriate exposure by means of a solid-state imaging element used in digital cameras, etc., may still leave something to be desired in terms of image quality when compared with silver-salt photographs. This is because the dynamic range of a solid-state imaging element is extremely narrow compared with that of a general silver-salt photography camera, with the result that, depending on the photographic conditions, a digital camera may produce blackening or whitening, greatly reducing the image quality. Recently, however, the development of elements allowing wide-dynamic-range imaging has become possible, and in line with this, it can be considered that there will a need in the future for an apparatus to reproduce recorded items picked up with a wide dynamic range.

Regarding documentation relating to this kind of technology, an apparatus that records information picked up with a wide dynamic range as the optimum exposure using a certain algorithm is described in Japanese Patent Laid-Open No. 11-69179. Also, in Japanese Patent Laid-Open No. 6-83430, a playback apparatus is proposed that enables the exposure level desired by the photographer to be reproduced at all times by adding to the image signal a signal that controls its exposure level.

However, with the apparatus in Japanese Patent Laid-Open No. 11-69179, as it is possible that the appropriate exposure conditions obtained by means of the above described algorithm may not be optimum for the photographer, the system is a recording/playback system that records images under a number of exposure conditions and has the photographer select the best exposure from among these.

Further, Japanese Patent Laid-Open No. 6-83430 is also for an apparatus that reproduces the exposure level desired by the photographer, and it is not possible to reflect the wishes of the viewer viewing the playback image. Thus, the apparatuses and systems in previous proposals only reflect the wishes of the photographer, and lack provision for realizing playback of an image desired by the viewer.

SUMMARY OF THE INVENTION

The present invention has been implemented taking into account the actual problems described above, and it is an objective of the present invention to provide an image playback apparatus that enables images picked up and recorded with a wide dynamic range to be changed to the exposure desired by the viewer.

In order to achieve the above described objective, the present invention is directed to an image playback apparatus that reproduces an image in visible form based on input image data, and that is provided with a function for changing the dynamic range of part or all of the playback image according to the wishes of the viewer viewing the image played back.

According to the present invention, it is possible for the wishes of the person playing back and looking at an image (the viewer) to be reflected, and for the viewer to change the display image quality of part of the image or the whole of the image screen as desired by the viewer. By this means, it is possible to reproduce appropriately parts of the image affected by whitening or blackening. Also, "playback" is not limited to the case where pre-recorded image data is reproduced, but also includes the case where image data being picked up by the imaging device is reproduced.

As one means of changing the dynamic range, there is an implementation whereby the tone conversion characteristic is changed, and even if the dynamic range is not changed, more detailed image reproduction is achieved by changing the tone conversion characteristic of part or all of the screen in accordance with the wishes of the viewer, and allocating more tones to the object area.

An image playback apparatus relating to another implementation of the present invention comprises an image data input unit to which image data is input; an image output device which reproduces an image in visible form based on image data received from the image data input unit; an area specifying device which specifies a desired area according to wishes of a viewer from within an image reproduced by the image output device; a tone conversion characteristic varying device which changes a tone conversion characteristic of a part or all of the image containing the area specified by the area specifying device; and an image processing device which creates the image to be reproduced by the image output device according to the tone conversion characteristic set by the tone conversion characteristic varying device.

There is an implementation whereby at least one display device or printer is provided as the above-described image output device. Also, there is an implementation whereby a display device is used as the above described image output device, and a line-of-sight detection apparatus for detecting the line-of-sight direction of the viewer looking at the screen of the above described display device is used as the above described area specifying device. By changing the tone conversion characteristic of the part of the screen where the viewer's line-of-sight is detected by the line-of-sight detection apparatus, it is possible to automatically reproduce the part being looked at by the viewer with the appropriate image quality.

According to yet another implementation of the present invention, a display device is used as the above described image output device, and a touch panel is provided on the above described display device as the above described area specifying device. By means of such an implementation, the viewer can change the tone conversion characteristic of the part he or she touches to perform more appropriate image reproduction, making possible image playback that reflects the viewer's wishes.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

With reference to the attached drawings, the preferred embodiments of the image playback apparatus relating to the present invention will be described in detail below.

Figure 1:
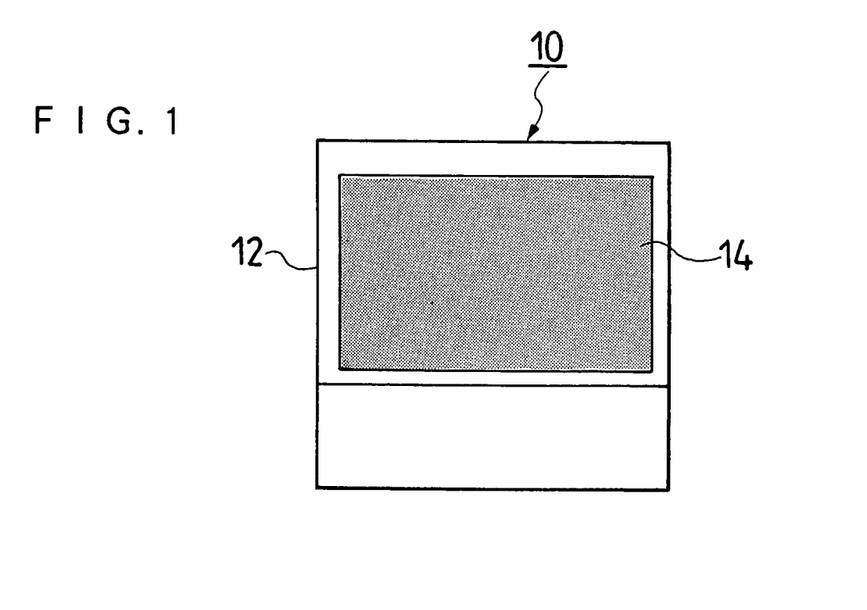
FIG. 1 is a front view of an image playback apparatus relating to an embodiment of the present invention.
Figure 2:
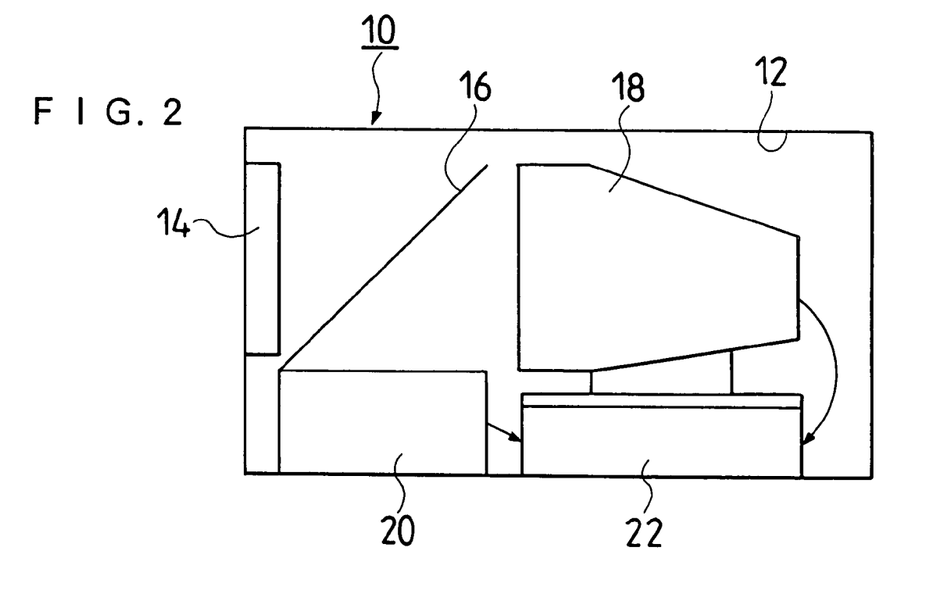
FIG. 2 is a side view showing the internal structure of the image playback apparatus shown in FIG. 1.

FIG. 1 is a front view of an image playback apparatus relating to an embodiment of the present invention, and FIG. 2 is a side view showing the internal structure of this apparatus. As shown in these drawings, the image playback apparatus 10 has a front panel 14 for screen viewing installed on the front of a casing 12, and inside the casing 12 are located a half-mirror 16, a monitor device 18, a line-of-sight detection apparatus 20, and a signal processing device 22.

For the monitor device 18, a CRT, a liquid crystal display, a plasma display, or other display device can be used. The line-of-sight detection apparatus 20 is an apparatus, standing in front of the front panel 14, that detects where on the screen of the monitor device 18 the viewer is looking at. The detected information is input to the signal processing device 22. Detection of the line-of-sight direction of the tested eye is achieved by projecting a light beam onto the front of the tested eye, and detecting the image reflected by the cornea or a crystal lens, by means of a photoelectric conversion element. The device for detecting the line-of-sight direction of the tested eye is a matter of common knowledge, and, for example, the technology described in Japanese Patent No. 2872292 can be used.

The signal processing device 22 includes a central processing unit (CPU) that controls the overall system and a signal processing unit that processes image data, etc. Image data is supplied to the image playback apparatus 10 by means of an external recording medium such as a memory card, or a communication function, etc. That is, image data is input to the signal processing device 22 by having a medium on which image data is recorded inserted into this image playback apparatus 10, or having image data supplied to the image playback apparatus 10 by means of a communication function. Also, The image playback apparatus 10 is provided with a film scanner function, and by inserting developed photographic film into the image playback apparatus 10, an implementation is also possible whereby image data can be obtained by picking up the photographic film image by means of a line sensor (imaging element) built into the apparatus.

Figure 3:
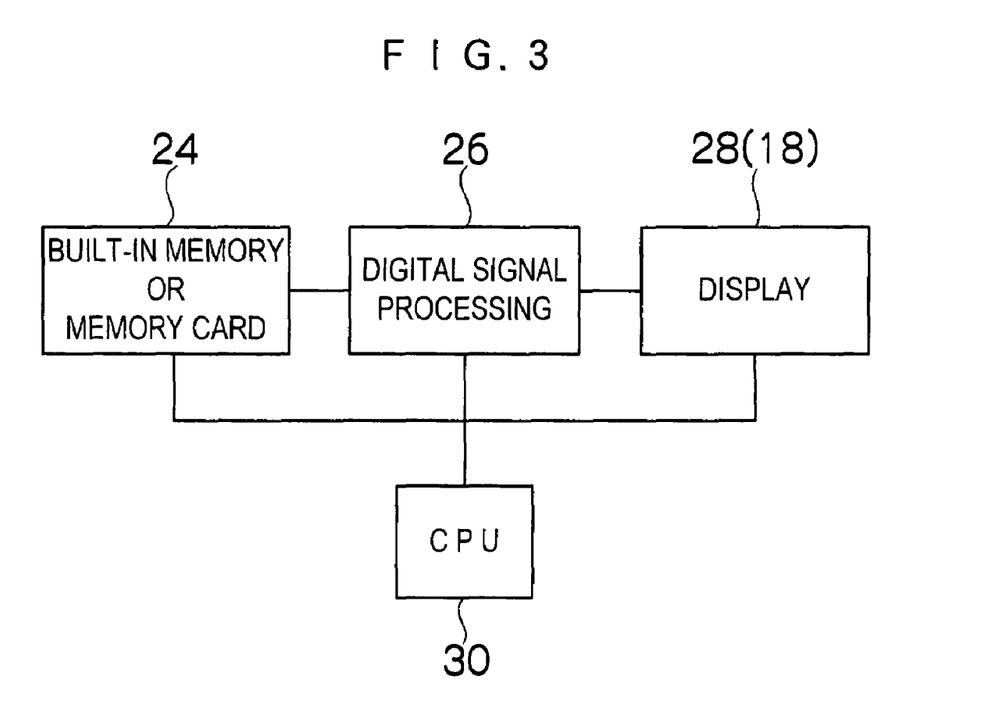
FIG. 3 is a block diagram showing the main configuration blocks of the image playback apparatus in this example.

FIG. 3 is a block diagram showing the main configuration blocks of the image playback apparatus. Reference numeral 24 in FIG. 3 denotes an image storage unit indicating built-in memory, or a memory card or other external recording medium, in which image data is stored, reference numeral 26 denotes a digital signal processing unit that processes image data, reference numeral 28 denotes a display unit corresponding to the monitor device 18 in FIG. 1, and reference numeral 30 denotes the CPU.

In the image storage unit 24 is stored image data picked up and recorded with a wide dynamic range by means of an imaging device such as a digital camera, not shown in the drawing. In image playback, image data is read from the image storage unit 24 in accordance with a CPU 30 command, and is conveyed to the digital signal processing unit 26. The digital signal processing unit 26 processes the image data in accordance with a CPU 30 command, converts it to the necessary signal format, and outputs it to the display unit 28.

The CPU 30 is a control unit that controls the digital signal processing unit 26, the display unit 28, and the other blocks, and performs image reproduction that reflects the wishes of the viewer, based on information input from the line-of-sight detection apparatus 20 or an operating unit, etc., not shown in the drawing.

Figure 4:
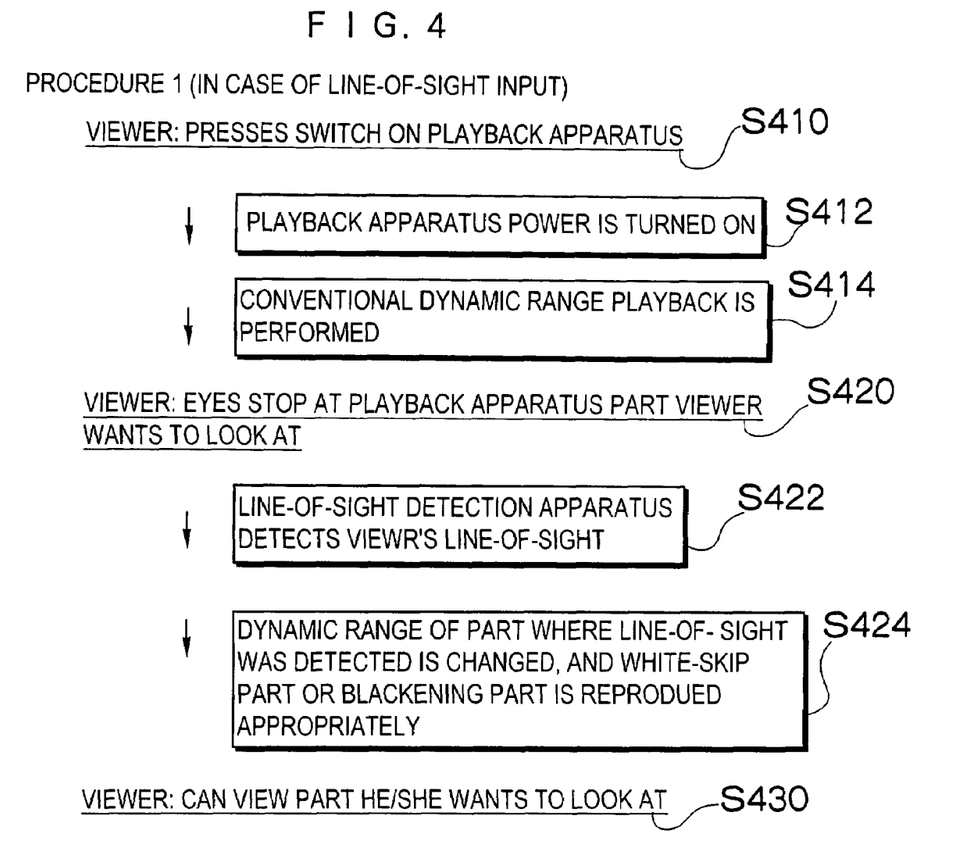
FIG. 4 is an explanatory drawing showing the operating procedure of the image playback apparatus shown in FIG. 1.

FIG. 4 shows the operating procedure of an image playback apparatus 10 with the above described configuration. The operation of this apparatus will now be described using this figure. First, the viewer (the person using the apparatus) presses the power switch of the image playback apparatus 10 (step S410). As a result, the power supply of the image playback apparatus 10 is turned on (step S412), and image playback processing is performed. In the playback processing at this time, conventional dynamic range based playback processing is executed (step S414).

Figure 5:
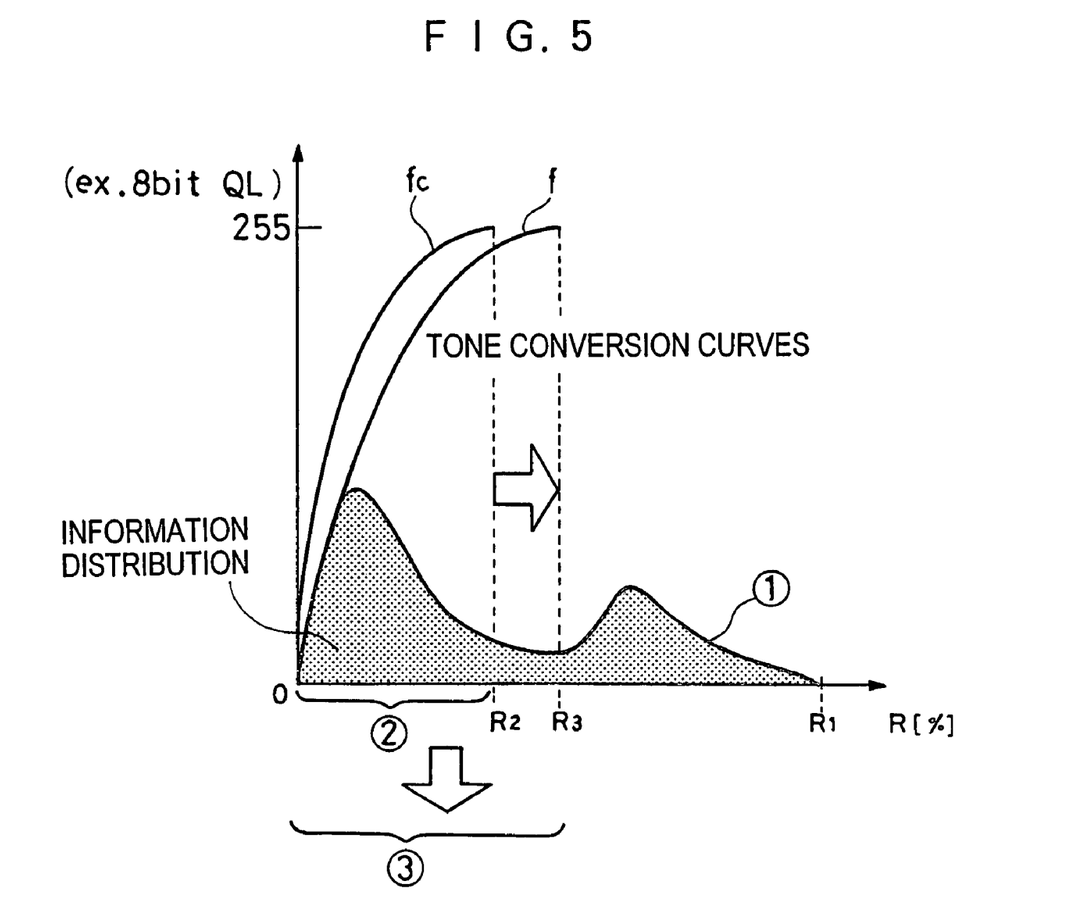
FIG. 5 is a drawing showing an example of modification of the tone conversion curve for the image playback apparatus in this example.

FIG. 5 shows tone conversion curves for this apparatus. In this figure, the horizontal axis shows the reflectance ratio of the photographic field, and the vertical axis shows the quantization level value (QL value) digitized to 8 bits. The image data stored in the image storage unit 24 is picked up and recorded with a wide dynamic range, and has image information for reflectance ratios of 0% to $R_1$%. Reference numeral (1) denotes the distribution of the image information.

In the "conventional dynamic range based playback" in step S414, part of the image information—that is, information for reflectance ratios of 0% to $R_2$% indicated by reference numeral (2) in FIG. 5—is converted in accordance with the tone conversion curve $f_c$ and output. In this way, the playback image is displayed on the screen of the monitor device 18. The viewer can look at this playback image through the front panel 14. With this playback method, information for areas with a reflectance ratio higher than $R_2$% is not used, and so a so-called "white-skip" image is produced.

When the viewer looks at a certain part of the monitor screen (step S420), the line-of-sight detection apparatus 20 detects the viewer's line-of-sight (step S422). For example, if the viewer's eyes stop at a white-skip part of the screen, the position to which the line-of-sight is directed is detected.

The viewer's line-of-sight detection information is input to the signal processing device 22, and the CPU 30 changes the dynamic range of a given area including the part in which the line-of-sight was detected (for example, an area containing a prescribed number of pixels with the line-of-sight detection point at its center, or a tone area around the line-of-sight detection point approximating the tone of the line-of-sight point taken as a reference), and reproduces a white-skip part or blackening part appropriately (step S424).

As the dynamic range conversion method, the range of the image information used for playback may, for example, be extended to the range of reflectance ratios 0% to $R_3$% indicated by reference numeral (3) in FIG. 5, and information within this range converted in accordance with tone conversion curve $f_V$ before being output.

In this way, a playback image is obtained in which image information for parts with a higher reflectance ratio is applied. By this means, the viewer can view the part he or she wants to look at in greater detail (step S430). This kind of screen tone conversion can be performed for only one part of the screen around the point at which the line-of-sight is detected, or can involve alteration of the tones of the entire screen.

In the above described embodiment, the location being looked at by the viewer is detected automatically by the line-of-sight detection apparatus 20, but instead of such an implementation, it is also possible to use a touch panel for the front panel 14, and specify the position of interest or area of interest by having the viewer himself or herself touch the desired part of the screen. In this case, the half-mirror 16 and the line-of-sight detection apparatus 20 are omitted, and the touch panel information is input directly to the signal processing device 22.

Figure 6:
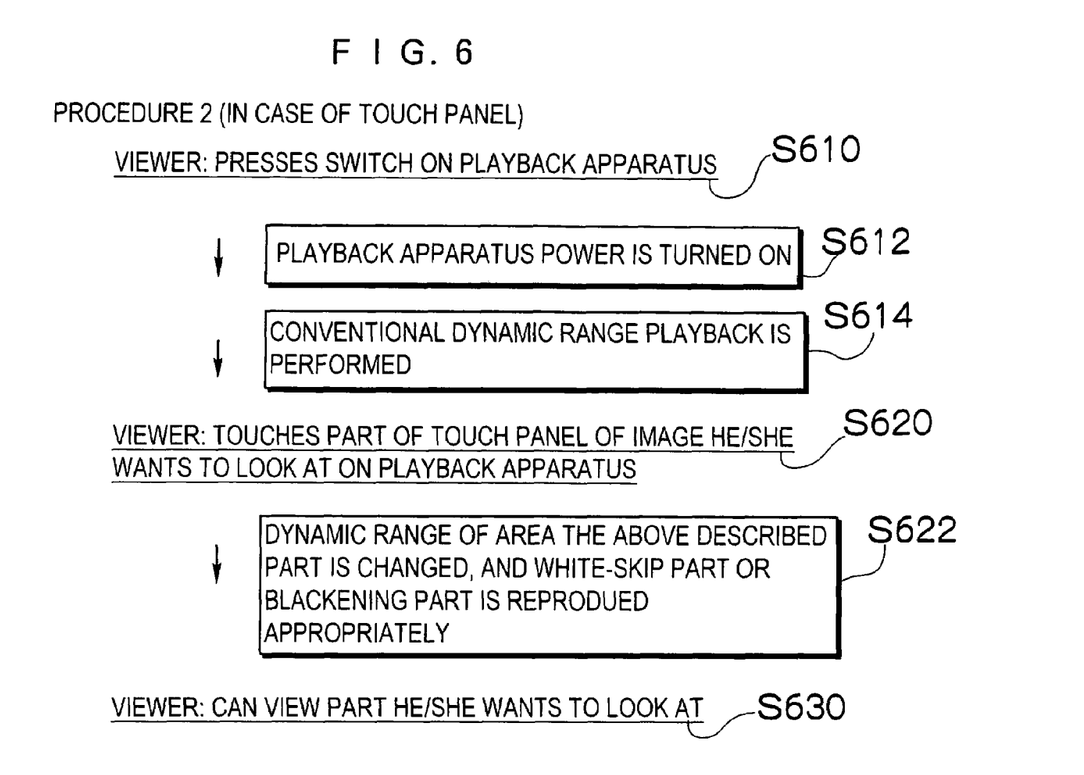
FIG. 6 is an explanatory drawing showing the operating procedure of an image playback apparatus equipped with a touch panel relating to another embodiment of the present invention.

FIG. 6 shows the operating procedure of an image playback apparatus equipped with a touch panel. In this case, the viewer first presses the power switch of the image playback apparatus (step S610). As a result, the power supply of the image playback apparatus is turned on (step S612), and image playback processing is performed. In the playback processing at this time, conventional dynamic range based playback processing is executed (step S614).

Next, the viewer specifies from the touch panel the part of the screen he or she wishes to look at (step S620). For example, if the viewer touches a part of the touch panel corresponding to a white-skip part of the screen, the touched position is detected. The information specified by the viewer is input to the signal processing device 22, and the CPU 30 changes the dynamic range of the part relating to the specification, and reproduces a white-skip part or blackening part appropriately (step S622).

In this way, the viewer can view the part he or she wants to look at in greater detail (step S630).

Figure 7:
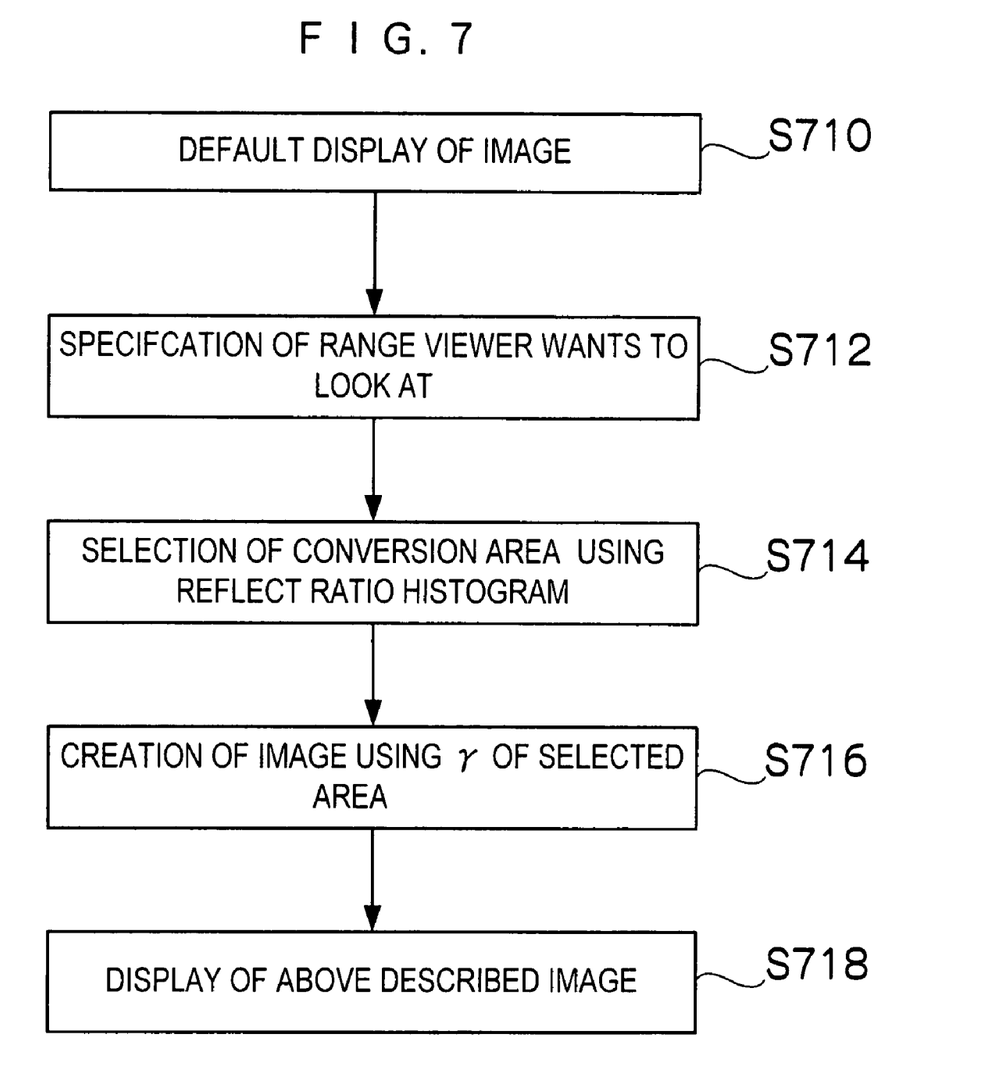
FIG. 7 is a flowchart showing the operating procedure of an image playback apparatus relating to yet another embodiment of the present invention.

FIG. 7 is a flowchart of yet another embodiment of the present invention. This is a flowchart for changing an image that is picked up and recorded with a wide dynamic range to the dynamic range desired by the viewer.

Figure 8:
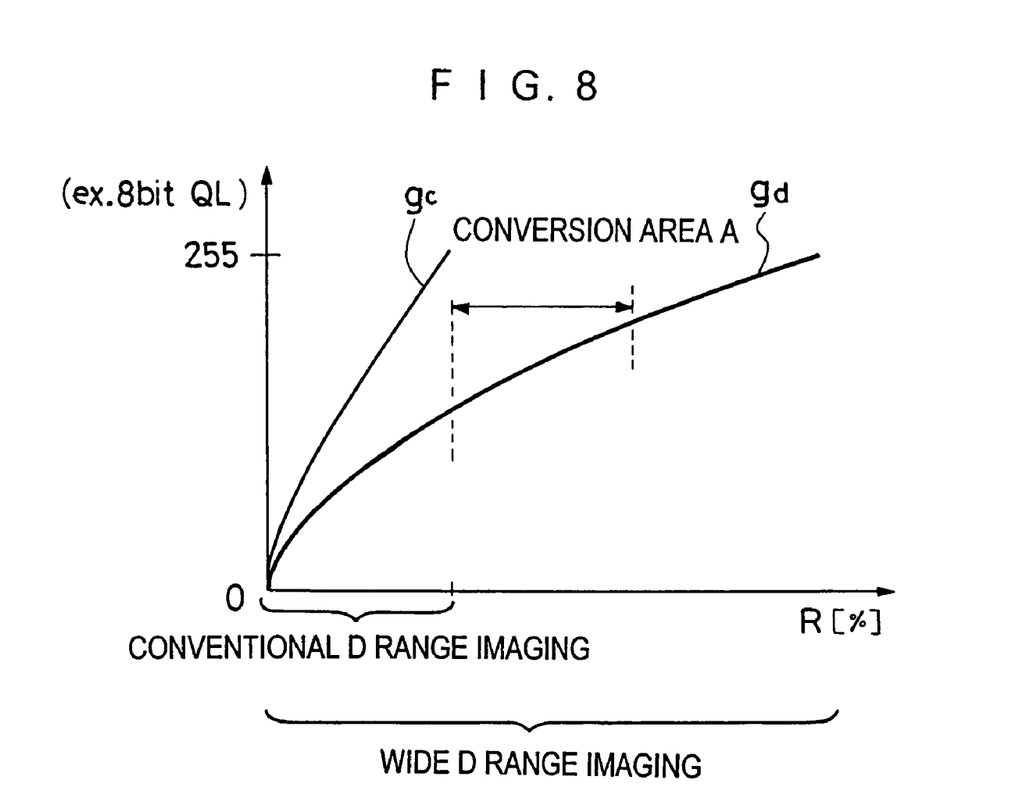
FIG. 8 is a drawing showing tone conversion curves for an image playback apparatus that operates in accordance with the flowchart in FIG. 7.

First, an image is default-displayed based on the input image data (step S710). At this time, in order for all image information picked up and recorded with a wide dynamic range to be displayed, a tone conversion curve such as that indicated by reference symbol gd in FIG. 8 is set, and display is performed on the monitor device 18. For the sake of comparison, FIG. 8 also shows the conventional dynamic range imaging range and a tone conversion curve $g_c$ using only image information within that range.

Next, the area to be looked at on the screen is specified based on the viewer's wishes (step S712). As the specification method, line-of-sight detection can be used, or the desired area can be specified using a touch panel. An area on the screen can also be specified by means of a mouse or other pointing device.

Figure 9:
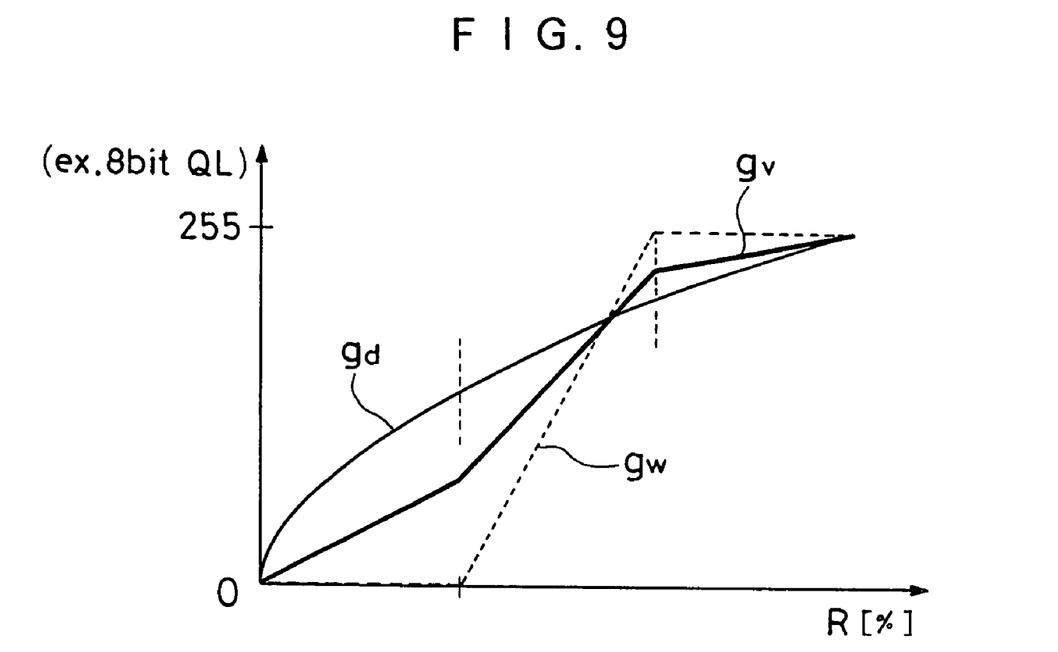
FIG. 9 is a drawing showing an example of modification of the tone conversion curve for an image playback apparatus that operates in accordance with the flowchart in FIG. 7.

Assuming that the viewer has specified a certain part of the screen, a histogram of the reflectance ratios of the specified area is created, and a reflectance ratio area containing, for example, 80% of these is selected as the conversion area (step S714). Let area A bounded by dashed lines in FIG. 8 be this conversion area. When such a conversion area A is selected, in order to perform more detailed image reproduction for the area relating to that selection, the tone conversion curve is changed as indicated by reference symbol $g_v$ in FIG. 9, and an image is created using the gamma (γ) value of the conversion area relating to the selection (step S716).

That is, image data is converted using tone conversion curve $g_v$, whereby many QL values are distributed in conversion area A, and an image is displayed on the monitor device 18 based on that converted image data (step S718). In this way, the selected area is reproduced in greater detail. Further, an extreme implementation is also possible for the tone conversion curve, whereby tones are given only to the selected conversion area A, as indicated by reference symbol $g_w$ in FIG. 9.

It is also possible to set the level for performing tone conversion in multiple steps, and change the tone conversion curve in stages in accordance with touch operations by the viewer, so that image reproduction gradually becomes more detailed with each touch operation. A configuration is also possible whereby the number of steps in such gradual alteration can be set arbitrarily by the viewer from an operating unit.

According to the present invention, it has become possible, in playback of an image that has been picked up and recorded with a wide dynamic range, to change the tones of part or the whole of the image as required by the viewer, enabling the part of interest to be viewed in greater detail.

FIG. 1 and FIG. 2 show the image playback apparatus 10 housed in a box-type casing 12, but the embodiment of the apparatus is not limited to this. For example, it is also possible for the entire system to be configured as a goggle-display type apparatus, or as a telescopic type apparatus. Also, the above description relates to an example in which images are played back on the monitor device 18 (display unit 28), but there is also an implementation whereby a printer is used as the means for outputting images, and images are reproduced on a medium such as printer paper and so forth.

Figure 10:
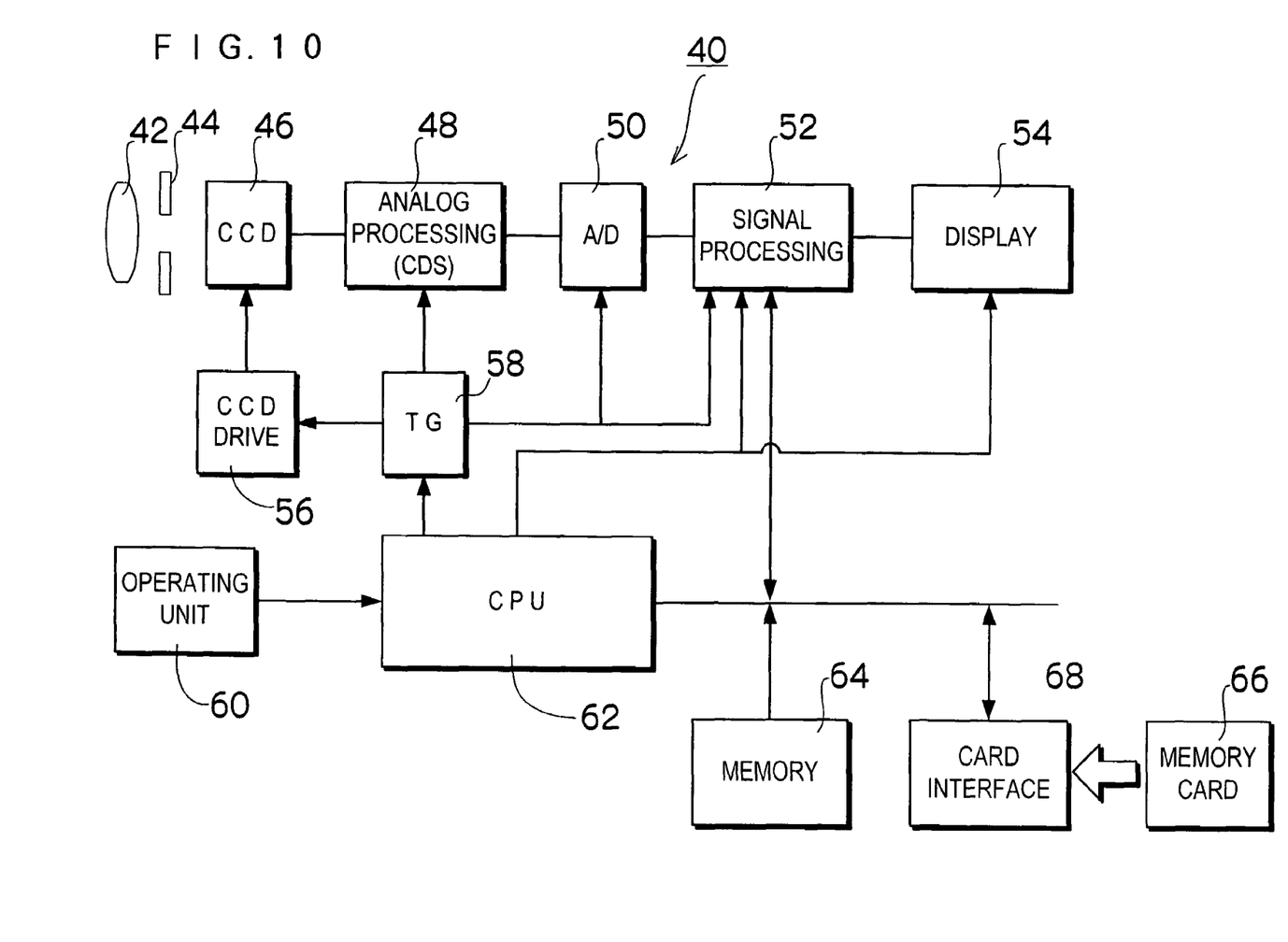
FIG. 10 is a block diagram showing another embodiment of the present invention.

Also, as a modified example of the above described embodiment, there is also an implementation whereby an imaging device is added to the image playback apparatus, and an image obtained by the imaging device is displayed on a display device. FIG. 10 is a block diagram of an image recording and playback apparatus equipped with an imaging device. As shown in this figure, this apparatus 40 is configured by a lens 42, an iris 44, a CCD image sensor 46 (called "CCD" below) as an imaging element, an analog processing unit 48, an A/D converter 50, a signal processing unit 52, a display unit 54, a CCD drive circuit 56, a timing signal generation circuit 58, an operating unit 60, a control CPU 62, memory 64, and a memory card 66 card interface 68.

A device capable of wide-dynamic-range image pickup is used as the CCD 46, enabling image information to be obtained for a wider range than with conventional dynamic range imaging. Light shone through the lens 42 is limited in quantity by the iris 44, and strikes the photoreception surface of the CCD 46. The photoreception surface of the CCD 46 has a planar arrangement of photoreceptor elements, and conversion is performed to a signal charge of a quantity in accordance with the incident quantity of light at each photoreceptor element of the CCD 46.

By this means, the converted signal charges are read sequentially as voltage signals (image signals) corresponding to signal charges based on CCD drive pulses applied from the CCD drive circuit 56, and are applied to the analog processing unit 48.

The analog processing unit 48 includes a correlated duplicate sampling (CDS) circuit, a gain control amplifier, and so forth. Image signals read from the CCD 46 are subjected to sample-and-hold processing for each pixel by the CDS circuit, are amplified by the gain control amplifier, and are then converted to R, G, and B digital signals by the A/D converter 50 and applied to the signal processing unit 52.

The timing signal generation circuit 58 outputs appropriate timing signals to the CCD drive circuit 56, analog processing unit 48, A/D converter 50, and signal processing unit 52, according to commands from the CPU 62, and synchronizes the circuits.

The signal processing unit 52, which includes a YC signal generation circuit, a compression/expansion circuit, and so forth, converts the above described R, G, and B digital signals to a YC signal (luminance signal Y and chroma signal C) in accordance with a command from the CPU 62, and stores the YC signal in the memory 64. Also, the signal processing unit 52 reads the YC signal from the memory 64 in accordance with a command from the CPU 62, processes it appropriately, and outputs it to the display unit 54 or card interface 68.

The signal processing unit 52, which includes a D/A converter, encoder, and so forth, converts the YC signal to an analog signal with the D/A converter, then generates an NTSC video signal, for example, with the encoder, and outputs this to the display unit 54. By having the video signal supplied to the display unit 54, in imaging mode the image captured by the CCD 46 is displayed on the display unit 54 as a moving picture in real time, or, though not in real time, as virtually continuous images.

The photographer can check the angle of view while looking at the display screen of the display unit 54. Capture of image data for recording is started in response to depression of the release button or record button on the operating unit 60.

When a mode in which image data is recorded in a memory card 66 is selected, the CPU 62 sends a command to the compression/expansion circuit in the signal processing unit 52, in response to which the compression/expansion circuit compresses the YC signal in the memory 64 in accordance with the JPEG format or another prescribed format. The compressed image data is recorded in the memory card 66 via the card interface 68. The recording medium need not be a memory card 66: various configurations are possible, including the use of a PC card, CompactFlash, magnetic disk, optical disk, magneto-optical disk, Memory Stick, video tape, and so forth, with use of a signal processing device and interface appropriate to the medium employed.

The operating unit 60 is a block including a release button that conveys an image recording start directive, etc., as well as an input device for camera mode settings and other settings, and a specifying device (which may be a line-of-sight detection apparatus) for specification by the viewer himself or herself of the desired position or area within the display screen of the display unit 54.

The CPU 62 is a control unit (a control device) for performing general control of each circuit in this system. The CPU 62 performs control of corresponding operations in response to input signals received from the operating unit 60, performing control of lens 12 zoom operations and automatic focusing (AF) operations, together with automatic exposure (AE) control. In addition, the CPU 62 functions as a processing control unit that generates display data to be displayed on the display unit 54.

The display unit 54 does not only display images captured by the CCD 46: in playback mode, image data recorded in the memory card 66 is read and the playback image thereof is displayed on the display unit 54.

The relevant image recording and playback apparatus 40 can, of course, also be configured with the addition of a data input unit allowing input of signals from outside via a communication interface, etc., enabling image data input from outside to be reproduced on the display unit 54.

According to an image recording and playback apparatus configured as described above, an image picked up by the CCD 46 is displayed on the display unit 54. In the display processing at this time, conventional dynamic range based display processing is executed. If the viewer looks at a certain part of the monitor screen, or specifies a desired position or area by means of a touch panel or similar means, the CPU 62 changes the dynamic range of the part relating to the specification, and displays a white-skip part or blackening part appropriately. As the technique for optimizing the display image in accordance with the viewer's wishes, the same kind of technique is used as for playback image optimization as illustrated in FIG. 1 through FIG. 9. By this means, the viewer can view the part of the display screen of the image being picked up that he or she wants to look at in greater detail.

In FIG. 10, an apparatus is described that is provided with both an image recording function and an image playback function; however, an apparatus is also possible in which the means for recording and storing picked-up image data is omitted, and which is specialized as a function for reproducing in visible form the image being picked up.

Also, in the embodiment shown in FIG. 10, control of the quantity of light is performed by means of an iris 44, but it is also possible to control the quantity of light by means of an electronic shutter that controls the charge storage time of the CCD 46.

As described above, according to an image playback apparatus relating to the present invention, it has been made possible to change the tones of part or the whole of a playback image in accordance with the wishes of the person looking at the image (the viewer), thus enabling white-skip or blackening parts of the image to be reproduced appropriately, reflecting the wishes of the viewer. By means of the present invention, it is possible for the image desired by the viewer to be obtained for an image picked up and recorded with a wide dynamic range.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image playback apparatus that reproduces an image in visible form based on input image data representing reflectance values, said image playback apparatus executing a function for automatically changing a dynamic range of at least a part of the reproduced image that has been selected by an action of a viewer viewing the reproduced image, wherein the at least a part is less than a whole, wherein a range of image information of the at least a part of the reproduced image mapped for reproducing is widened compared to a range of image information of a rest of the reproduced image mapped for reproducing when the function for automatically changing the dynamic range of the at least a part of the reproduced image is executed, wherein the image playback apparatus is configured to select the at least a part of the reproduced image by generating a histogram of reflectance ratio information of an area specified by the viewer, and selecting, as the at least a part of the reproduced image mapped for reproducing, a reflectance ratio area that includes a predetermined percentage of the generated histogram of the reflection ratio information of the area specified by the viewer, and wherein the predetermined percentage is less than 100%.

2. An image playback apparatus that reproduces an image in visible form based on input image data representing reflectance values, said image playback apparatus executing a function for automatically changing a tone conversion characteristic of at least a part of the reproduced image that has been selected by an action of a viewer viewing the reproduced image, wherein the at least a part is less than a whole, wherein when the function for automatically changing the tone conversion characteristic of the at least a part of the reproduced image is executed, a range of output values mapped to a range of image information of the at least a part of the reproduced image is wider after executing the function than before executing the function, wherein the range of output values mapped to the range of image information of the at least a part of the reproduced image after executing the function is less than an entire range of possible output values, wherein the image playback apparatus is configured to select the at least a part of the reproduced image by generating a histogram of reflectance ratio information of an area specified by the viewer, and selecting, as the at least a part of the reproduced image mapped for reproducing, a reflectance ratio area that includes a predetermined percentage of the generated histogram of the reflection ratio information of the area specified by the viewer, and wherein the predetermined percentage is less than 100%.

3. An image playback apparatus, comprising:

an image data input unit to which image data representing reflectance values is input;

an image output device which reproduces an image in visible form based on the image data received from the image data input unit;

an area specifying device which specifies a desired area from within an image reproduced by the image output device, wherein the desired area has been selected by an action of a viewer viewing the reproduced image;

a tone conversion characteristic varying device which automatically changes a tone conversion characteristic of at least a part of the image containing the area specified by the area specifying device, wherein the at least a part is less than a whole; and an image processing device which creates the image to be reproduced by the image output device according to the tone conversion characteristic set by the tone conversion characteristic varying device, wherein when the tone conversion characteristic varying device automatically changes the tone conversion characteristic of the at least a part of the image, a range of output values mapped to a range of image information of the at least a part of the image is wider after the change than before the change, wherein the range of output values mapped to the range of image information of the at least a part of the image after the change is less than an entire range of possible output values, wherein the area specifying device is configured to generate a histogram of reflectance ratio information the desired area, and select, as the at least a part of the image, a reflectance ratio area that includes a predetermined percentage of the generated histogram of the reflection ratio information of the desired area, and wherein the predetermined percentage is less than 100%.

4. A method of enhancing an image in visible form with an image playback apparatus, said method comprising:

reproducing an image in visible form based on input image data representing reflectance values on an image output device;

executing a function for automatically changing a dynamic range of at least a part of the reproduced image that has been selected by an action of a viewer viewing the reproduced image on the image output device, wherein the at least a part is less than a whole, wherein the step of executing the function for automatically changing the dynamic range comprises widening a range of image information of the at least a part of the reproduced image mapped for reproducing relative to a range of image information of a rest of the reproduced image mapped for reproducing;

generating a histogram of reflectance ratio information of an area specified by the viewer; and selecting, as the at least a part of the reproduced image mapped for reproducing, a reflectance ratio area that includes a predetermined percentage of the generated histogram of the reflection ratio information of the area specified by the viewer, wherein the predetermined percentage is less than 100%.

5. A method of enhancing an image in visible form with an image playback apparatus, said method comprising:

reproducing an image in visible form based on input image data representing reflectance values on an image output device;

executing a function for automatically changing a tone conversion characteristic of at least a part of the reproduced image that has been selected by an action of a viewer viewing the reproduced image on the image output device, wherein the at least a part is less than a whole, wherein when the function for automatically changing the tone conversion characteristic of the at least a part of the reproduced image is executed, a range of output values mapped to a range of image information of the at least a part of the reproduced image is wider after executing the function than before executing the function, and wherein the range of output values mapped to the range of image information of the at least a part of the reproduced image after executing the function is less than an entire range of possible output values, generating a histogram of reflectance ratio information of an area specified by the viewer, and selecting, as the at least a part of the reproduced image mapped for reproducing, a reflectance ratio area that includes a predetermined percentage of the generated histogram of the reflection ratio information of the area specified by the viewer, and wherein the predetermined percentage is less than 100%.

6. The image playback apparatus according to claim 1, wherein the image information of the reproduced image mapped for reproducing is reflectance ratio information of the reproduced image.

7. The image playback apparatus according to claim 2, wherein the image information of the reproduced image mapped for reproducing is reflectance ratio information of the reproduced image.

8. The image playback apparatus according to claim 3, wherein the image information of the reproduced image mapped for reproducing is reflectance ratio information of the reproduced image.

9. The method of according to claim 4, wherein the image information of the reproduced image mapped for reproducing is reflectance ratio information of the reproduced image.

10. The method of according to claim 5, wherein the image information of the reproduced image mapped for reproducing is reflectance ratio information of the reproduced image.

11. The image playback apparatus according to claim 1, wherein the image playback apparatus displays the whole of the reproduced image according to the mapping of the image information for reproducing the at least a part of the reproduced image.

12. The image playback apparatus according to claim 2, wherein the image playback apparatus displays the whole of the reproduced image according to the mapping of the image information for reproducing the at least a part of the reproduced image.

13. The image playback apparatus according to claim 3, wherein the image processing device creates the whole of the image to be reproduced by the image output device according to the mapping of the image information for reproducing the at least a part of the reproduced image.

14. The method of according to claim 4, further comprising displaying the whole of the reproduced image according to the mapping of the image information for reproducing the at least a part of the reproduced image.

15. The method of according to claim 5, further comprising displaying the whole of the reproduced image according to the mapping of the image information for reproducing the at least a part of the reproduced image.

16. An image playback apparatus that reproduces an image in visible form based on input image data representing reflectance values, said image playback apparatus executing a function for automatically changing a dynamic range of at least a part of the reproduced image that has been selected by an action of a viewer viewing the reproduced image,
wherein the at least a part is less than a whole,
wherein the input image data is raw image data that has not yet been subjected to any lossy compression/decompression processing,
wherein the image playback apparatus is configured to select the at least a part of the reproduced image by
generating a histogram of reflectance ratio information of an area specified by the viewer, and
selecting, as the at least a part of the reproduced image mapped for reproducing, a reflectance ratio area that includes a predetermined percentage of the generated histogram of the reflection ratio information of the area specified by the viewer, and
wherein the predetermined percentage is less than 100%.

17. An image playback apparatus that reproduces an image in visible form based on input image data representing reflectance values, said image playback apparatus executing a function for automatically changing a tone conversion characteristic of at least a part of the reproduced image that has been selected by an action of a viewer viewing the reproduced image,
wherein the at least a part is less than a whole,
wherein the input image data is raw image data that has not yet been subjected to any lossy compression/decompression processing
wherein the image playback apparatus is configured to select the at least a part of the reproduced image by
generating a histogram of reflectance ratio information of an area specified by the viewer, and
selecting, as the at least a part of the reproduced image mapped for reproducing, a reflectance ratio area that includes a predetermined percentage of the generated histogram of the reflection ratio information of the area specified by the viewer, and
wherein the predetermined percentage is less than 100%.

18. An image playback apparatus, comprising:
an image data input unit to which image data representing reflectance values is input;
an image output device which reproduces an image in visible form based on the image data received from the image data input unit;
an area specifying device which specifies a desired area from within an image reproduced by the image output device, wherein the desired area has been selected by an action of a viewer viewing the reproduced image;
a tone conversion characteristic varying device which automatically changes a tone conversion characteristic of at least a part of the image containing the area specified by the area specifying device, wherein the at least a part is less than a whole; and
an image processing device which creates the image to be reproduced by the image output device according to the tone conversion characteristic set by the tone conversion characteristic varying device,
wherein the image data input to the image data input unit is raw image data that has not yet been subjected to any lossy compression/decompression processing,
wherein the area specifying device is configured to
generate a histogram of reflectance ratio information the desired area, and
select, as the at least a part of the image, a reflectance ratio area that includes a predetermined percentage of the generated histogram of the reflection ratio information of the desired area, and
wherein the predetermined percentage is less than 100%.

19. A method of enhancing an image in visible form with an image playback apparatus, said method comprising:
reproducing an image in visible form based on input image data representing reflectance values on an image output device;
executing a function for automatically changing a dynamic range of at least a part of the reproduced image that has been selected by an action of a viewer viewing the reproduced image on the image output device, wherein the at least a part is less than a whole,
wherein the input image data is raw image data that has not yet been subjected to any lossy compression/decompression processing,
generating a histogram of reflectance ratio information of an area specified by the viewer, and
selecting, as the at least a part of the reproduced image mapped for reproducing, a reflectance ratio area that includes a predetermined percentage of the generated histogram of the reflection ratio information of the area specified by the viewer,
wherein the predetermined percentage is less than 100%.

20. A method of enhancing an image in visible form with an image playback apparatus, said method comprising:
reproducing an image in visible form based on input image data representing reflectance values on an image output device;
executing a function for automatically changing a tone conversion characteristic of at least a part of the reproduced image that has been selected by an action of a viewer viewing the reproduced image on the image output device, wherein the at least a part is less than a whole,
wherein the input image data is raw image data that has not yet been subjected to any lossy compression/decompression processing;
generating a histogram of reflectance ratio information of an area specified by the viewer, and
selecting, as the at least a part of the reproduced image mapped for reproducing, a reflectance ratio area that includes a predetermined percentage of the generated histogram of the reflection ratio information of the area specified by the viewer,
wherein the predetermined percentage is less than 100%.

* * * * *